(12) United States Patent
Chaganti et al.

(10) Patent No.: US 11,095,730 B1
(45) Date of Patent: Aug. 17, 2021

(54) AUTOMATED DEVICE DISCOVERY SYSTEM

(71) Applicant: Dell Products L.P., Round Rock, TX (US)

(72) Inventors: Ravikanth Chaganti, Bangalore (IN); Dharmesh M. Patel, Round Rock, TX (US)

(73) Assignee: Dell Products LLP, Round Rock, TX (US)

( * ) Notice: Subject to any disclaimer, the term of this patent is extended or adjusted under 35 U.S.C. 154(b) by 0 days.

(21) Appl. No.: 17/019,714

(22) Filed: Sep. 14, 2020

(51) Int. Cl.
*H04L 29/08* (2006.01)
*G06F 9/54* (2006.01)

(52) U.S. Cl.
CPC .............. *H04L 67/16* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 8,594,632 B1 | 11/2013 | Azizi et al. | |
| 2003/0097425 A1* | 5/2003 | Chen | H04L 29/12207 709/220 |
| 2016/0080380 A1* | 3/2016 | Dawoud Shenouda Dawoud | H04L 63/0442 713/156 |
| 2016/0248746 A1* | 8/2016 | James | H04L 9/3268 |
| 2016/0323153 A1* | 11/2016 | Cordray | H04L 67/1002 |
| 2016/0337181 A1* | 11/2016 | Cathrow | H04L 61/1541 |
| 2017/0262523 A1* | 9/2017 | Epstein | H04L 67/12 |

* cited by examiner

*Primary Examiner* — Jeffrey R Swearingen
(74) *Attorney, Agent, or Firm* — Haynes and Boone, LLP

(57) ABSTRACT

An automated device discovery system includes a first computing device and second computing devices that are included in a trust domain. The first computing device generates and broadcasts a discovery request for target computing device identification information. Each of a first subset of the second computing devices receives the discovery request from the first computing device and, in response to being in the trust domain with the first computing device, determines that a target computing device type qualifier included in the discovery request identifies a type of that second computing device. In response, each of the first subset of second computing devices executes a command block that is included in the discovery request to generate and transmit identity information for that second computing device that is configured for use by the first computing device in configuring that second computing device to provide a hyper-converged infrastructure system.

20 Claims, 12 Drawing Sheets

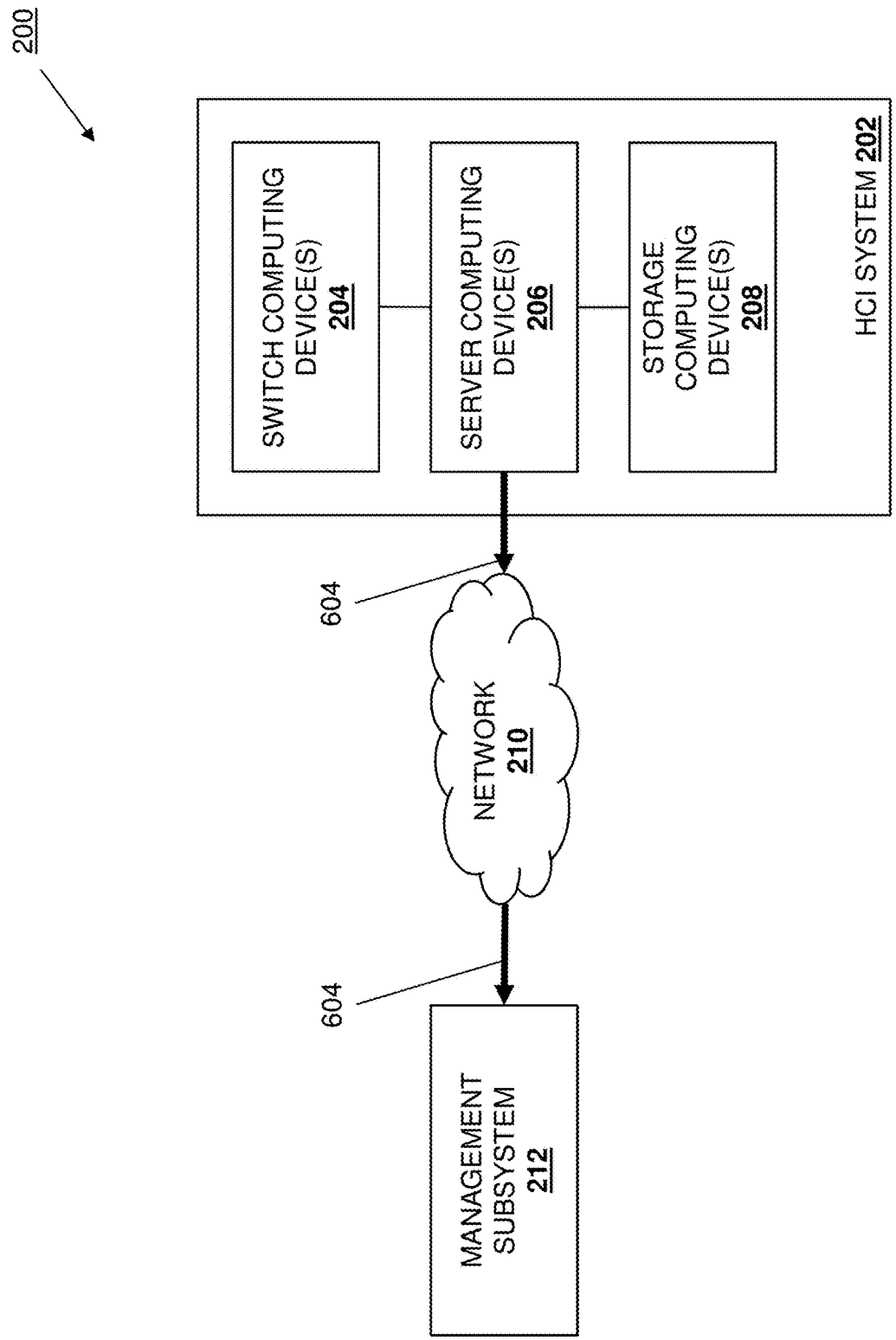

AUTOMATED DEVICE DISCOVERY SYSTEM

BACKGROUND

The present disclosure relates generally to information handling systems, and more particularly to automatically discovering an information handling system in order to, for example, configure that information handling system to provide a hyper-converged infrastructure system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes utilized to provide hyper-converged infrastructure systems, which one of skill in the art in possession of the present disclosure will recognize is a software-defined Information Technology (IT) infrastructure that virtualizes the elements of conventional hardware-defined systems. For example, server computing device(s), switch computing device(s), and/or storage computing device(s) may be configured in a hyper-converged infrastructure system to provide virtualized computing functionality (e.g., via a hypervisor or other virtualized computing component), software-defined storage, and/or virtualized/software-defined networking. The conventional configuration of such hyper-converged infrastructure systems can raise some issues.

As will be appreciated by one of skill in the art, the configuration of a hyper-converged infrastructure system requires the discovery of the server computing devices in the hyper-converged infrastructure system. Conventional server device discovery is often performed using Internet Protocol version 6 (IPv6) addresses utilized by those server computing devices. For example, a management system that configures hyper-converged infrastructure systems may broadcast an IPv6 address request in a Layer 2 (L2) domain that includes computing devices, and each of the computing devices in that L2 domain may then respond with their IPv6 link-layer addresses. However, this server device discovery technique requires each computing device and the management system to connect to the same switch computing device with no Virtual Local Area Network (VLAN) configuration, and cannot span across both spine switch devices and leaf switch devices (i.e., the management system and computing devices must be at the leaf layer).

Furthermore, in this server device discovery technique, the management system may then receive the requested IPv6 addresses, and must operate to determine which of those IPv6 addresses belong to server computing devices by "guessing" what type of computing device each IPv6 address belongs to, as well as the credential information required to access that computing device. As such, for each IPv6 address received, the management system will attempt to remotely access that computing device based on the guessed type of computing device (and thus the remote access technique for accessing that type of computing device) and guessing credential information that is stored in the management system. As will be appreciated by one of skill in the art, remote access attempts will fail if the type of computing device (and thus the remote access technique) and/or credential information are guessed incorrectly, and the management system must then retry the remote access guesses until the computing device is remotely accessed successfully, which is a time-consuming process. One conventional solution to this issue is to provide computing devices that are configured to identify themselves (e.g., via Link Layer Discovery Protocol (LLDP) Type/Length/Value (TLV) data structures), but such solutions require that each computing device be provided with an operating system with such capabilities, which is not always feasible.

Accordingly, it would be desirable to provide an automated device discovery system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an automated device discovery engine that is configured to: receive a discovery request that was broadcast by a first computing device; and determine that the automated device discovery engine is in a trust domain with the first computing device and, in response: determine that a target computing device type qualifier that is included in the discovery request identifies a type of the IHS; execute, in response to determining that the target computing device type qualifier identifies the type of the IHS, a command block that is included in the discovery request; and generate and transmit, in response to executing the command block, identity information for the IHS that is configured for use by the first computing device in configuring the IHS to provide a hyper-converged infrastructure system.

BRIEF DESCRIPTION OF THE DRAWINGS

FIG. 6E is a schematic view illustrating an embodiment of the automated device discovery system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
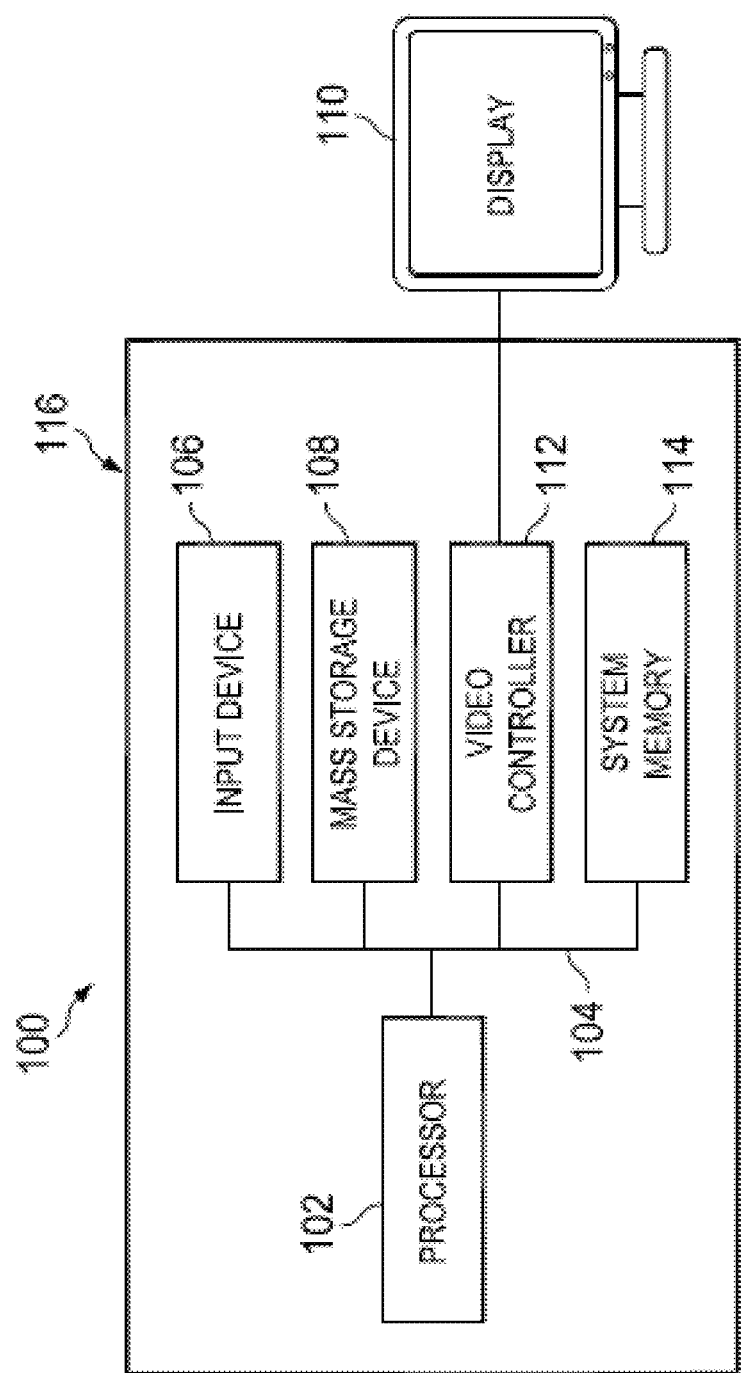
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
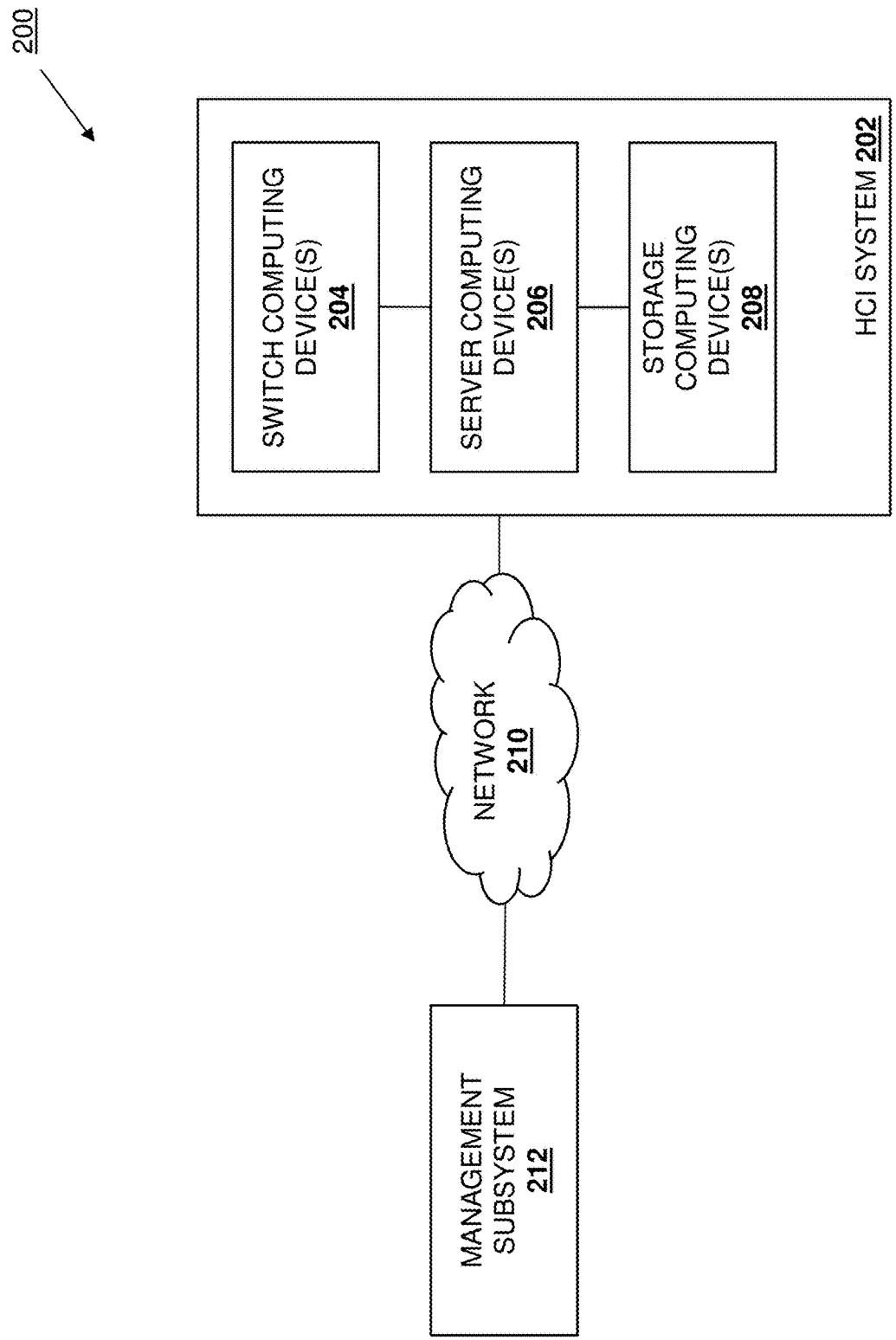
FIG. 2 is a schematic view illustrating an embodiment of an automated device discovery system.

Referring now to FIG. 2, an embodiment of an automated device discovery system 200 is illustrated. In the illustrated embodiment, the automated device discovery system 200 includes a hyper-converged infrastructure system 202 that includes one or more switch computing devices 204, one or more server computing devices 206, and one or more storage computing devices 208, each of which are coupled together and that may be configured to operate to provide hyper-converged infrastructure functionality that virtualizes the elements of conventional hardware-defined systems via the provisioning of virtualized computing functionality (e.g., via a hypervisor or other virtualized computing component), software-defined storage, and/or virtualized/software-defined networking. In an embodiment, any or all of the switch computing devices 204, server computing devices 206, and/or storage computing devices 208 may be provided by the IHS 100 discussed above with reference to FIG. 1, and/or may include some or all of the components of the IHS 100. In the examples below, server computing devices 206 are discovered via the teachings of the present disclosure, but one of skill in the art in possession of the present disclosure will recognize that the switch computing devices 204, storage computing devices 208, and/or other computing devices may be discovered using the teachings provided herein while remaining within the scope of the present disclosure as well.

In a specific example, the switch computing device(s) 204 may be provided by Top Of Rack (TOR) switch device(s) in a rack, with the server computing device(s) 206 and the storage computing device(s) 208 provided by server device(s) and storage device(s) that are included in that rack and coupled to the TOR switch device(s). However, while illustrated and discussed as being provided by TOR switch device(s), server device(s), and storage device(s), one of skill in the art in possession of the present disclosure will recognize that computing devices provided in the automated device discovery system 200 may include any devices that may be configured to operate similarly as the computing devices discussed below. As such, in some embodiments, any of the switch computing device(s) 204, server computing device(s) 206, and/or storage computing device(s) 208 may be omitted from the HCI system 202 while remaining within the scope of the present disclosure as well.

In the illustrated embodiment, the HCI system 202 is coupled to a network 210 that may be provided by a Local Area Network (LAN), the Internet, combinations thereof, and/or any other network that would be apparent to one of skill in the art in possession of the present disclosure. Furthermore, the illustrated embodiment includes a management subsystem 212 that is also coupled to the network 210. In an embodiment, the management subsystem 212 may be provided by the IHS 100 discussed above with reference to FIG. 1, and/or may include some or all of the components of the IHS 100, and in the specific examples discussed below may be provided by one or more server devices that are configured to perform the management subsystem functionality described below. However, while illustrated and discussed as being provided by server device(s) connected to the HCI system 202 via a network 210, one of skill in the art in possession of the present disclosure will recognize management subsystems provided in the automated device discovery system 200 may include any devices that may be configured to operate similarly as the management subsystem 212 discussed below.

For example, in some embodiments, the management subsystem functionality described below may be performed by management controller device(s) in the switch computing device(s) 204, server computing device(s) 206, and/or storage computing device(s) 208 (e.g., an integrated DELL® Remote Access Controller (iDRAC) device available in server devices provided by DELL® Inc. of Round Rock, Tex., United States, a Baseboard Management Controller (BMC) device, and/or other management controller devices known in the art) while remaining within the scope of the present disclosure as well. Thus, while a specific automated device discovery system 200 has been illustrated and described, one of skill in the art in possession of the present disclosure will recognize that the automated device discovery system of the present disclosure may include a variety of components and component configurations while remaining within the scope of the present disclosure as well.

Figure 3:
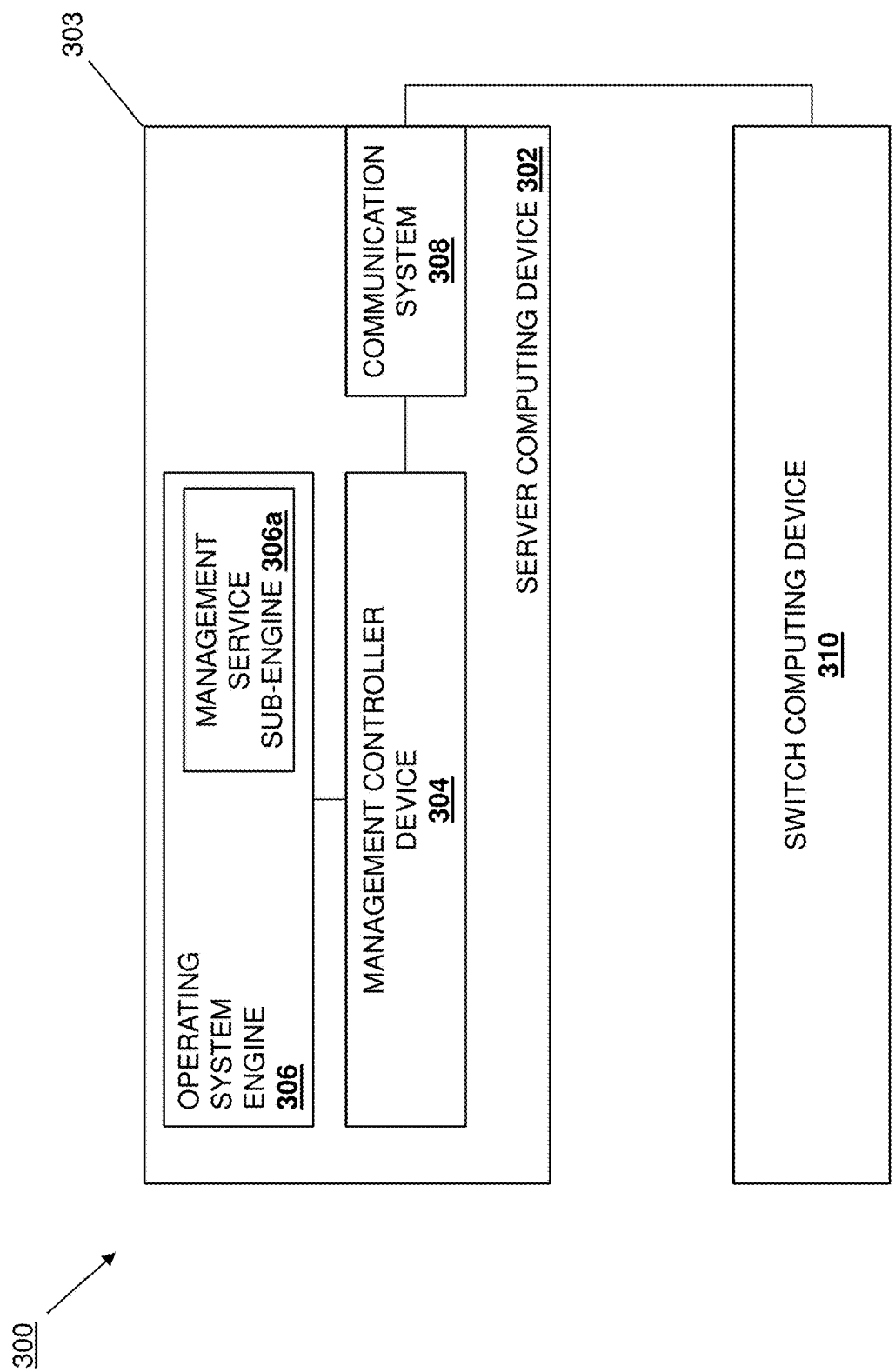
FIG. 3 is a schematic view illustrating an embodiment of a computing device configuration that may be provided in the automated device discovery system of FIG. 2.

Referring now to FIG. 3, an embodiment of a computing device configuration 300 is illustrated that includes a server computing device 302 that may be provided by one of the server computing devices 206 discussed above with reference to FIG. 2. As such, the server computing device 302 may be provided by the IHS 100 discussed above with reference to FIG. 1 and/or may include some or all of the components of the IHS 100. However, while illustrated and discussed as being provided by a server device in many of the examples below, one of skill in the art in possession of the present disclosure will recognize that the functionality of the server device 302 discussed below may be provided by other devices (e.g., the switch computing device(s) 204, the storage computing device(s) 208, etc.) that are configured to operate similarly as the server computing device 302 discussed below. In the illustrated embodiment, the server computing device 302 includes a chassis 303 that houses the components of the server computing device 302, only some of which are illustrated in FIG. 3.

For example, the chassis 303 may house a management controller device 304 that may be provided by the iDRAC® discussed above, a BMC, and/or any other management controller device that would be apparent to one of skill in the art in possession of the present disclosure. As will be appreciated by one of skill in the art in possession of the present disclosure, the management controller device 304 may provide an out-of-band management platform for the server computing device 302 that utilizes resources that are mostly separate from the server computing device 302 (e.g., a dedicated processing system, memory system, network connection, access to the system bus, etc.) and may provide a browser-based or command-line interface for managing and/or monitoring the server computing device 302.

As illustrated, the chassis 303 may also house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an operating system engine 306 that is coupled to the management controller device 304 (e.g., via a coupling of the processing system and the management controller device 304) and that is configured to provide an operating system and perform any of the functionality of the operating system engines and/or server computing devices discussed below. Furthermore, as illustrated and discussed below, the operating system engine 306 may include a management service sub-engine 306a (e.g., provided via instructions on the memory system that, when executed by the processing system, cause the processing system to provide the management service sub-engine 306a) that may be provided by an integrated Service Module (iSM) included in the iDRAC® discussed above, and/or other management services that would be apparent to one of skill in the art in possession of the present disclosure. As will be appreciated by one of skill in the art in possession of the present disclosure, the management controller device 304 may be coupled to the operating system engine 306 via a management channel that may be available to the management controller device 304 even when other communication channels coupled to the operating system engine 306 are unavailable.

The chassis 303 may also house a communication system 308 that is coupled to the management controller device 304 and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In an embodiment, the management controller device 304 may be coupled to the communication system 308 via a management channel that is available to the management controller device 304 even when other communication channels in the server computing device 302 are unavailable (e.g., when the server computing device 302 is powered down). As illustrated, the computing device configuration 300 also includes a switch computing device 310 that may be provided by one of the switch computing devices 204 discussed above with reference to FIG. 2, and that is coupled to the server computing device 302 via the communication system 308. In some embodiments, the connection between the server computing device 302 and the switch computing device 310 may include a management channel to the management controller device 304, which one of skill in the art in possession of the present disclosure will recognize may be part of a management network that allows access to the management controller device 304 in order to perform management operations on the server computing device 302. However, while particular a computing device configuration 300 is illustrated and described that includes a switch computing device and a server computing device, one of skill in the art in possession of the present disclosure will appreciate that other computing device configurations (e.g., including other types of computing devices) will fall within the scope of the present disclosure as well.

Figure 4:
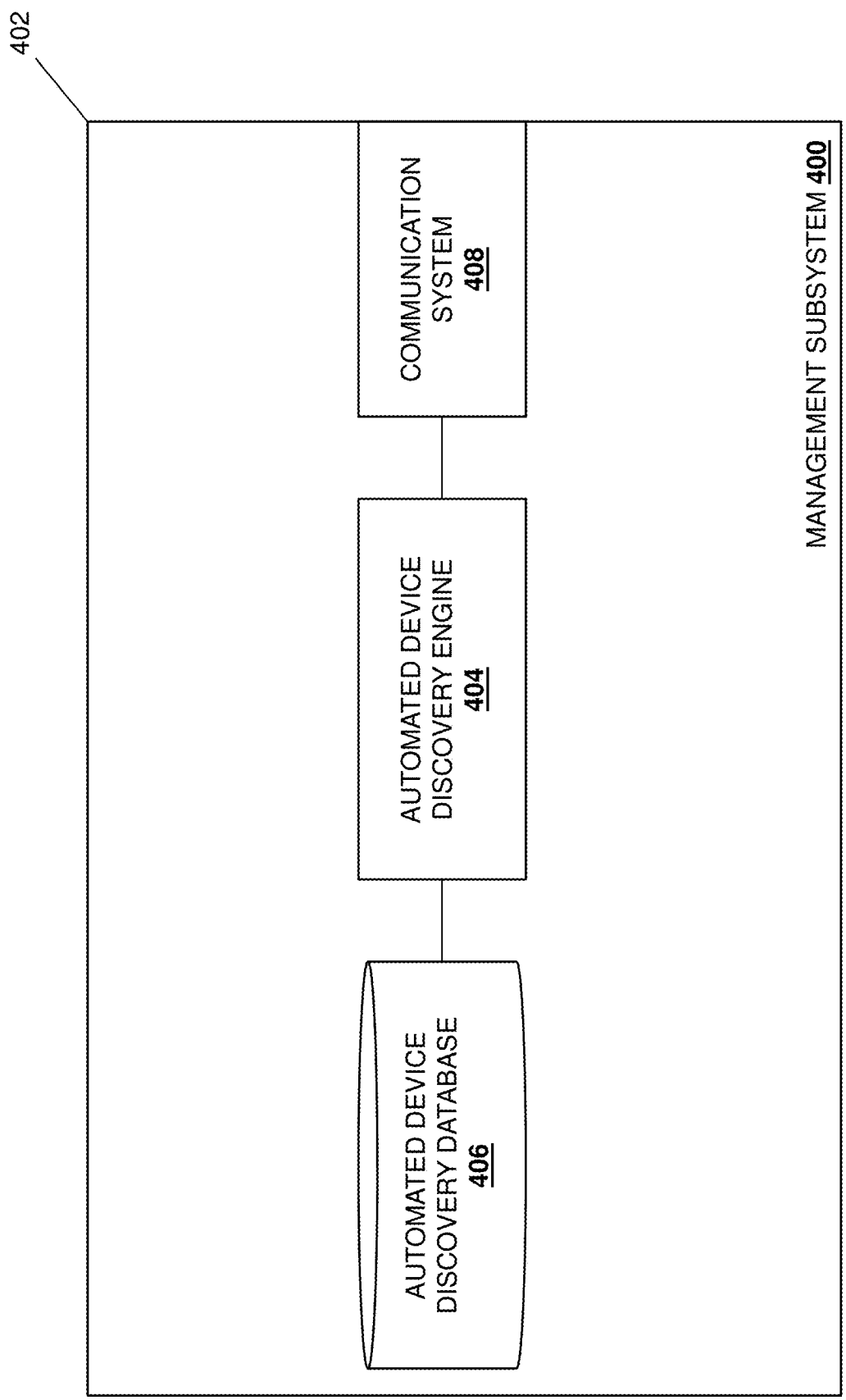
FIG. 4 is a schematic view illustrating an embodiment of a management subsystem that may be provided in the automated device discovery system of FIG. 2.

Referring now to FIG. 4, an embodiment of a management subsystem 400 is illustrated that may provide the management subsystem 212 discussed above with reference to FIG. 2, or that may be included in any of the any of the switch computing device(s) 204, server computing device(s) 206, and/or storage computing device(s) 208 discussed above with reference to FIG. 2. As such, the management subsystem 400 may be provided by the IHS 100 discussed above with reference to FIG. 1 and/or may include some or all of the components of the IHS 100, and in specific examples may be provided by one or more server devices connected to the network 210, or may be provided by a management controller device (e.g., the iDRAC®, BMC, or other management controller devices discussed above) in one of the server computing devices 206. However, while illustrated and discussed as being provided by specific devices in many of the examples below, one of skill in the art in possession of the present disclosure will recognize that the functionality of the management subsystem 400 discussed below may be provided by other devices that are configured to operate similarly as the management subsystem 400 discussed below.

In the illustrated embodiment, the management subsystem 400 includes a chassis 402 that houses the components of the management subsystem 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an automated device discovery engine 404 that is configured to perform the functionality of the automated device discovery engines and/or management subsystems discussed below.

The chassis 402 may also house a storage system (not illustrated, but which may include the storage 108 discussed above with reference to FIG. 1) that is coupled to the automated device discovery engine 404 (e.g., via a coupling between the storage system and the processing system) and that includes an automated device discovery database 406 that is configured to store any of the information utilized by the automated device discovery engine 404 discussed below. The chassis 402 may also house a communication system 408 that is coupled to the automated device discovery engine 404 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific management subsystem 400 has been illustrated, one of skill in the art in possession of the present disclosure will recognize that management subsystems (or other devices operating according to the teachings of the present disclosure in a manner similar to that described below for the management subsystem 400) may include a variety of components and/or component configurations for providing conventional management subsystem functionality, as well as the functionality discussed below, while remaining within the scope of the present disclosure as well.

Figure 5:
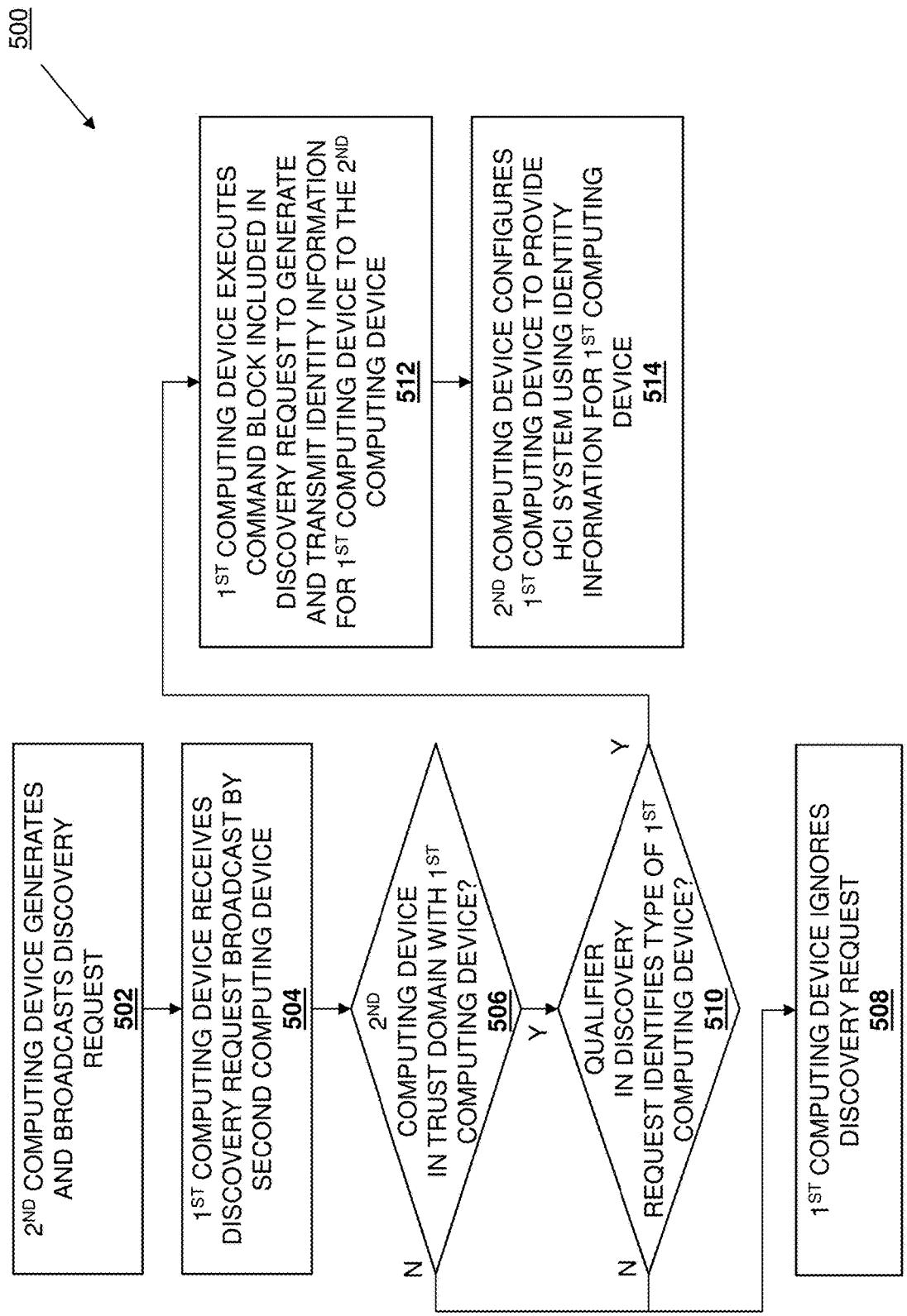
FIG. 5 is a flow chart illustrating an embodiment of a method for automatically discovering devices.

Referring now to FIG. 5, an embodiment of a method 500 for automatically discovering devices is illustrated. As discussed below, the systems and methods of the present disclosure provide an agent-less and credential-less technique for discovering computing devices that utilizes a trust domain built for computing devices provided in a hyper-converged infrastructure system, and that operates by having a management subsystem communicate with those computing devices within the trust domain by broadcasting a discovery request that identifies a type of computing device to-be discovered and commands to be executed by those computing devices to transmit their identity information to the management system so that the management system may configure those computing devices as part of the hyper-converged infrastructure system. For example, the automated device discovery system of the present disclosure may include a first computing device and second computing devices that are included in a trust domain. The first computing device generates and broadcasts a discovery request for target computing device identification information, and each of a first subset of the second computing devices receives the discovery request from the first computing device and, in response to being in the trust domain with the first computing device, determines that a target computing device type qualifier included in the discovery request identifies a type of that second computing device. In response, each of the first subset of second computing devices executes a command block that is included in the discovery request to generate and transmit identity information for that second computing device that is configured for use by the first computing device in configuring that second computing device to provide a hyper-converged infrastructure system. As such, computing devices may be discovered in an efficient, agent-less, and credential-less manner.

In some embodiments, prior to or during the method 500, a "trust domain" may be built for the hyper-converged infrastructure system 202 using techniques described by the inventors of the present disclosure in U.S. patent application Ser. No. 17/019,523, filed on Sep. 14, 2020, the disclosure of which is incorporated herein by reference. As such, as described in that patent application, the computing devices in the HCI system 202 may be configured to utilize authentication information and a computing device component hash value to have their communications validated by each other without the need for credentials or certificates that are required to secure communications in conventional hyper-converged infrastructure systems. Furthermore, in embodiments in which the management subsystem 212 is utilized in the method 500, the management subsystem 212 may join the trust domain for the HCI system 202 as well, which as discussed in some of the examples below allows the computing devices in the hyper-converged infrastructure 202 to confirm that the management subsystem 212 is part of the trust domain for the hyper-converged infrastructure system 202, and exchange information with the management subsystem 212 in a secure manner and without the need for credentials or certificates that are required to secure communications in conventional hyper-converged infrastructure systems. Thus, the communications exchanged between the computing devices in the HCI system 202 as discussed below, as well as by the management subsystem 212 with those computing devices discussed in some embodiments below, may be performed as part of a trust domain.

Figure 6A:
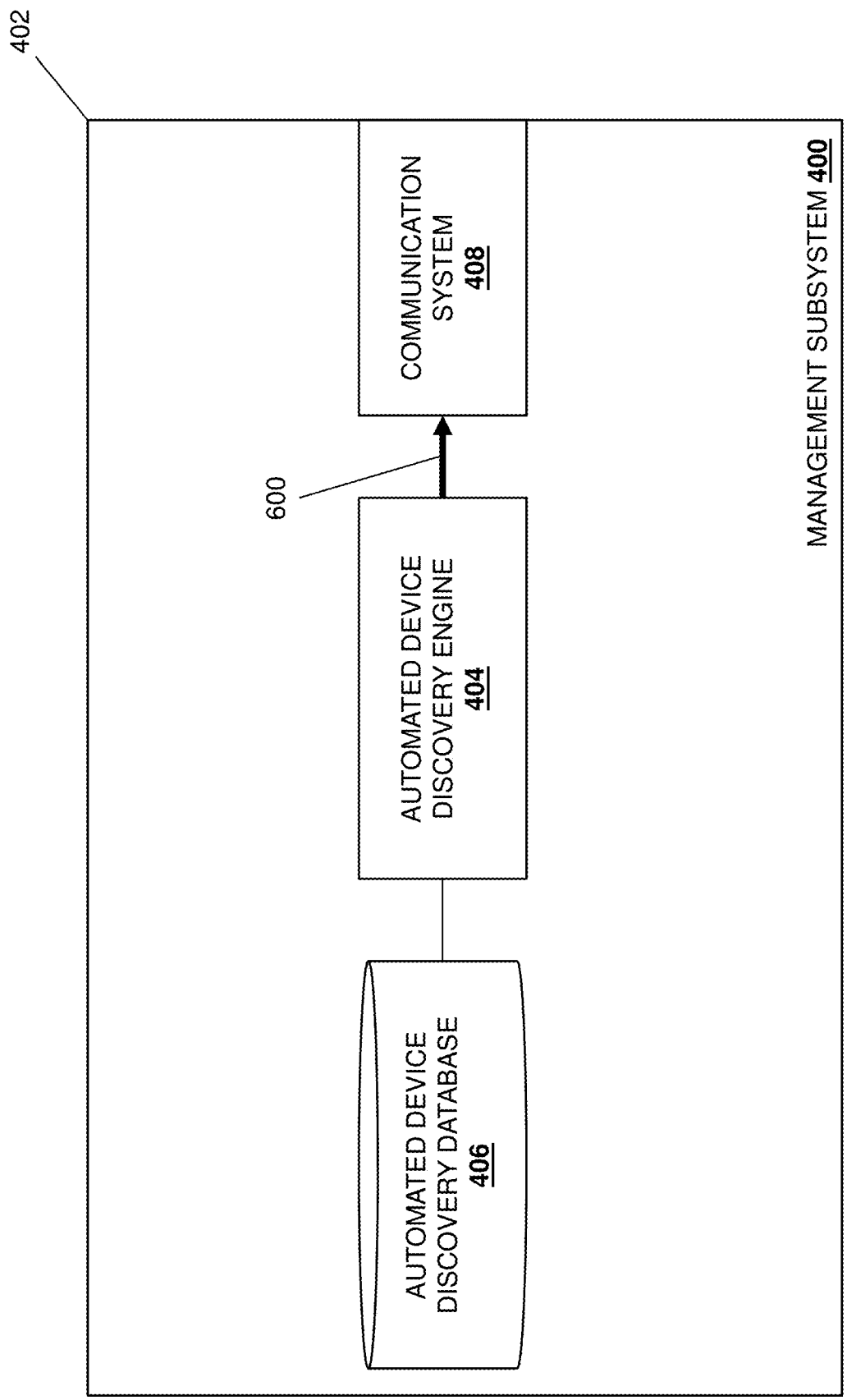
FIG. 6A is a schematic view illustrating an embodiment of devices in the computing device configuration of FIG. 3 operating during the method of FIG. 5.
Figure 6B:
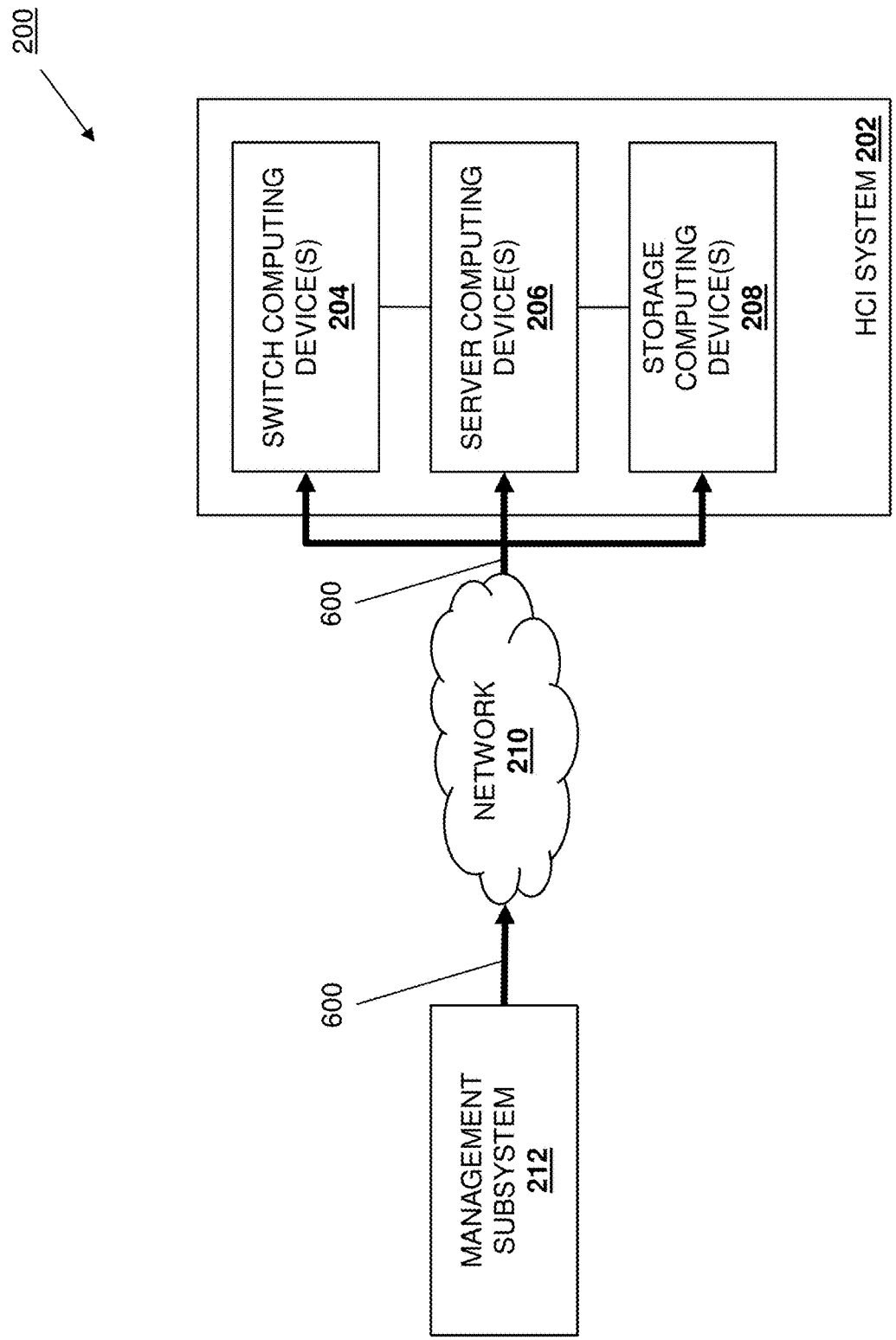
FIG. 6B is a schematic view illustrating an embodiment of the automated device discovery system of FIG. 2 operating during the method of FIG. 5.

The method 500 begins at block 502 where a second computing device generates and broadcasts a discovery request. With reference to FIG. 6A, in an embodiment of block 502, the automated device discovery engine 404 in the management subsystem 212/400 may perform discovery request broadcast operations 600 that include generating and broadcasting a discovery request through its communication system 408 and via the network 210 to the computing devices in the hyper-converged infrastructure system 202. In this example, block 502 may be performed subsequent to the building of the trust domain for the hyper-converged infrastructure system 202 discussed above, and as part of an initialization of the hyper-converged infrastructure system 202. As such, each of the computing devices in the hyper-converged infrastructure system 202 may be connected (e.g., cabled) to each other and the network 210, and powered-on or otherwise initialized to perform the trust domain operations referenced above as part of an "initial onboarding" process, which as discussed below is followed by a "source" discovery request broadcast that is performed by the management subsystem 212. However, as also discussed below, the teachings of the present disclosure may be applied to the discovery of a computing device that has been added to the hyper-converged infrastructure system 202 as part of an "expansion" process, followed by a "target" discovery broadcast that is performed by that computing device, while remaining within the scope of the present disclosure as well.

As will be appreciated by one of skill in the art in possession of the present disclosure, the "source" discovery request broadcast may be performed by the management subsystem 212 in order to discover computing device(s) of a particular type that are included in the trust domain for the hyper-converged infrastructure system 202, and while the examples below provide for the discovery of server computing devices (i.e., a server computing device type), the discovery of other types of computing devices (switch computing devices, storage computing devices, etc.) will fall within the scope of the present disclosure as well. In an embodiment, the discovery request generated and broadcast at block 502 may provide a request for any computing devices that are of a desired type (i.e., the type of computing device that the management system 212 is trying to discover) to respond with identity information for that computing device.

As such, in an embodiment and for the purposes of the discovery of server computing devices as described below, the discovery request generated and broadcast by the management subsystem 212 at block 502 may include a target device computing device type qualifier that defines the type of computing device (e.g., server computing devices in this example) that is being discovered and thus should respond to the discovery request. For example, the target device computing device type qualifier for a server computing device may be provided by an Application Programming Interface (API) identifier for a particular API that is utilized by (and/or otherwise available on) server computing devices in the hyper-converged infrastructure system 202. In a specific example, the server computing device 206/302 including the management controller device 304 (e.g., an iDRAC®, BMC, etc.) may utilize a version 1 REDFISH® API that is identified by a version 1 REDFISH® API identifier (e.g., "/redfish/v1"), and thus the target device computing device type qualifier in the discovery request broadcast by the management subsystem 212 at block 502 may include "/redfish/v1", which one of skill in the art in possession of the present disclosure will appreciate operates (in effect) to identify server computing devices as the type of computing device being discovered via the discovery request (i.e., because only server computing devices 206 in the hyper-converged infrastructure system 202 utilize the version 1 REDFISH® API).

Furthermore, in an embodiment and for the purposes of the discovery of server computing devices as described below, the discovery request generated and broadcast by the management subsystem 212 at block 502 may also include a command block that includes executable command(s) and/or other instruction(s) (e.g., a binary, powershell command(s), unix command(s), etc.) that are configured to provide a response to the discovery request with identity information. For example, the command block for server computing devices may include instruction(s) to retrieve and transmit identity information for that server computing device via its management controller device, its operating system, and/or from other server computing device identity information sources that would be apparent to one of skill in the art in possession of the present disclosure. In a specific example, the command block for server computing devices may include instruction(s) to retrieve and transmit identity information that may include Media Access Control (MAC) addresses utilized by (or in) that server computing device, service tag(s) associated with that server computing device, Network Interface Controller (NIC) devices types included in the server computing device, and/or any other unique server computing device information that would be apparent to one of skill in the art in possession of the present disclosure.

However, while a specific discovery request for identifying server computing devices has been described, one of skill in the art in possession of the present disclosure will recognize how the discovery request provided according to the teachings of the present disclosure may be modified for use in discovering other types of computing devices while remaining within the scope of the present disclosure as well. Furthermore, while the discovery request is discussed above as being broadcast by the management subsystem 212, as discussed above the management subsystem functionality may be provided in a management controller device (e.g., the management controller device 304 in the server device 206/302), a switch computing device (e.g., a TOR switch device to which the server computing devices are connected), and/or other computing devices performing the discovery operations discussed herein while remaining within the scope of the present disclosure as well.

The method 500 then proceeds to block 504 where a first computing device receives the discovery request broadcast by the second computing device. In an embodiment, at block 504, each of the computing devices in the hyper-converged infrastructure 202 may receive the discovery request broadcast at block 502. For example, with reference to FIG. 6C, the management controller device 304 in the server computing device 206/302 is illustrated as performing discovery request broadcast receiving operations 602 to receive the discovery request broadcast at block 502 via its communication system 308 and from the switch computing device 310. As such, in some embodiments, the switch computing device 204/310 may receive the discovery request broadcast by the management system 212 and forward that discovery request to the management controller device 304 in the server computing device 206/302, while in other embodiments the switch computing device 204/310 may generate the discovery request and broadcast that discovery request to the management controller device 304 in the server computing device 206/302 (as well as other devices connected to that switch computing device 204/310).

The method 500 then proceeds to decision block 506 where it is determined whether the second computing device is in a trust domain with the first computing device. In an embodiment, at decision block 506, any computing device (e.g., a management controller device in that computing device) receiving the discovery request broadcast at block 502 may validate that discovery request to determine whether the computing device that broadcast that discovery request is in its trust domain, as described by the inventors of the present disclosure in U.S. patent application Ser. No. 17/019,523, filed on Sep. 14, 2020, the disclosure of which is incorporated herein by reference. As such, continuing with the specific examples provided above, the management subsystem 212 and any computing device in the hyper-converged infrastructure 202 that receives the discovery request may perform the trust domain operations described in that patent application in order for that computing device to validate the discovery request received from the management subsystem 212 (e.g., by verifying that the management subsystem 212 is part of (and/or should remain in) the trust domain for the hyper-converged infrastructure system 202).

Figure 6C:
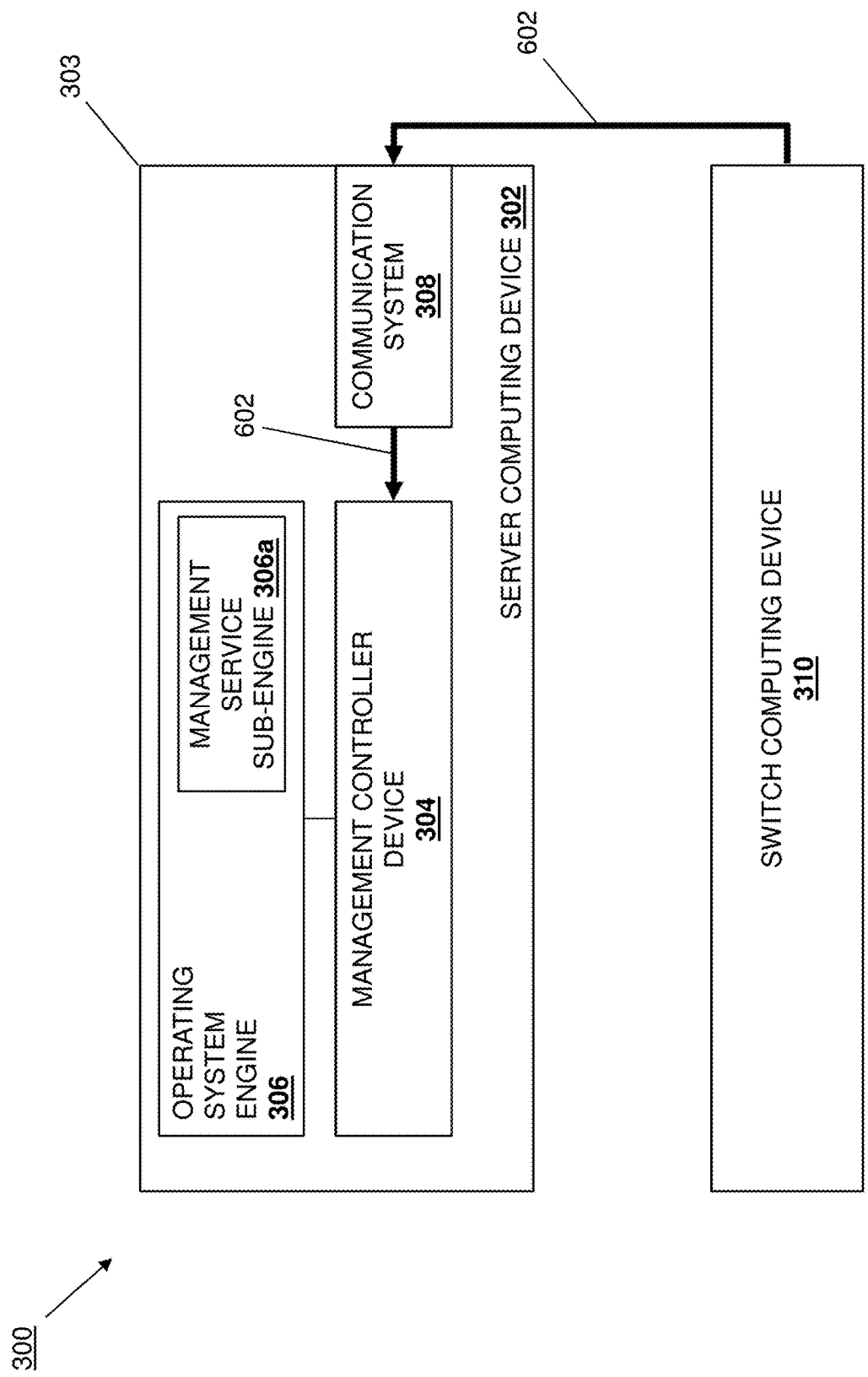
FIG. 6C is a schematic view illustrating an embodiment of devices in the computing device configuration of FIG. 3 operating during the method of FIG. 5.

For example, with reference to FIG. 6C, in some embodiments, the switch computing device 204/310 and the management subsystem 212 may perform the trust domain operations referenced above in order for the switch computing device 204/310 to validate the discovery request received from the management subsystem 212 (e.g., by verifying that the management subsystem 212 is part of (and/or should remain in) the trust domain for the hyper-converged infrastructure system 202). Similarly, the management controller device 304 in the server computing device 206/302 and the switch computing device 204/310 may perform the trust domain operations described in that patent application in order for the management controller device 304 to validate the discovery request received from the switch computing device 204/310 (e.g., by verifying that the switch computing device 204/310 is part of (and/or should remain in) the trust domain for the hyper-converged infrastructure system 202). As such, the discovery request received by the management controller device 304 in the server computing device 206/302 may be validated without the use of credentials or certificates that are required in conventional hyper-converged infrastructure systems.

If, at decision block 506, it is determined that the first computing device is not in the trust domain with the second computing device, the method 500 proceeds to block 508 where the first computing device ignores the discovery request received at block 504. As described by the inventors of the present disclosure in U.S. patent application Ser. No. 17/019,523, filed on Sep. 14, 2020, the disclosure of which is incorporated herein by reference, any computing device (e.g., the management controller device in that computing device) receiving a discovery request and determining that the computing device that transmitted that discovery request is not included in (or should be removed from) the trust domain for the hyper-converged infrastructure system 202 may operate to ignore that discovery request. As such, computing devices in the hyper-converged infrastructure system 202 may not be discovered by a computing device that is not in the trust domain for the hyper-converged infrastructure system 202.

If, at decision block 506, it is determined that the first computing device is in the trust domain with the second computing device, the method 500 proceeds to decision block 510 where it is determined whether a qualifier in the discovery request identifies a type of the first computing device. In an embodiment, at decision block 510 and following a determination that the discovery request was received from a computing device that is included in the trust domain for the hyper-converged infrastructure system 202, the computing device receiving that discovery request may retrieve the target computing device type qualifier included in that discovery request, and determine whether that target computing device type qualifier identifies the type of that computing device. Continuing with the example provided above, at decision block 510 and in response to determining that the discovery request was received from the management subsystem 212 and/or switch computing device 204/310 in its trust domain, the management controller device 304 in the server computing device 206/302 (and other computing devices in the hyper-converged infrastructure system 202) may access the target computing device type qualifier in the discovery request that is provided by the API identifier (e.g., "/redfish/v1"), and determine whether that API identifier identifies an API utilized by that computing device.

If, at decision block 510, it is determined that the qualifier in the discovery request does not identify the type of the first computing device, the method 500 proceeds to block 508 where the first computing device ignores the discovery request received at block 504. Continuing with the examples above where the discovery request provides for the discovery of server computing devices, in an embodiment in which a switch computing device 204, storage computing device 208, or other non-server computing device receives the discovery request, that computing device will determine that the target computing device type qualifier included in that discovery request does not identify the type of that computing device (e.g., the API identifier (e.g., "/redfish/v1") does not identify an API utilized by the switch computing device 204 and/or storage computing device 208). As such, computing devices in the hyper-converged infrastructure system 202 that are not the type of computing device being discovered will not respond to the discovery request broadcast at block 502.

If, at decision block 506, it is determined that the qualifier in the discovery request identifies the type of the first computing device, the method 500 proceeds to block 512 where the first computing device executes a command block included in the discovery request to generate and transmit identity information for the first computing device to the second computing device. Continuing with the examples above where the discovery request provides for the discovery of server computing devices, in an embodiment in which the management controller device 304 in the server computing device 206/302 receives the discovery request, the management controller device 304 will determine that the target computing device type qualifier included in that discovery request identifies the type of the server computing device 206/302 (e.g., the API identifier (e.g., "/redfish/v1") identifies an API utilized by the management controller device 304 in the server computing device 206/302). In response, at block 512, the management controller device 304 may access the command block included in the discovery request.

As discussed above, the discovery request may include a command block that includes executable command(s) and/or other instruction(s) (e.g., a binary, powershell command(s), unix command(s), etc.) to respond to the discovery request with identity information. In some embodiments of block 512 and in response to the target computing device type qualifier identifying server computing devices, the management controller device 304 in the server computing device 206/302 may access the command block and evaluate the command block to determine whether the execution of the command block should retrieve the identity information for the server computing device 206/302 directly, or via a "proxy" (e.g., the management service sub-engine 306a) from the operating system provided by the operating system engine 306.

For example, the management controller device 304 in the server computing device 206/302 may identify metadata in the command block that describes the prerequisites needed to execute the executable command(s) and/or other instruction(s) in the command block, which one of skill in the art in possession of the present disclosure will recognize allows for a determination of whether the management controller device 304 should retrieve the identity information for the server computing device 206/302 directly, or retrieve that identity information via the management service sub-engine 306a that provides a proxy to the operating system provided by the operating system engine 306. In the event the management controller device 304 determines that the identity information for the server computing device 206/302 should be retrieved via the management service sub-engine 306a that provides a proxy to the operating system provided by the operating system engine 306, the management controller device 304 and the management service sub-engine 306a may perform the trust domain operations referenced above in order for the management service sub-engine 306a to validate a proxy request transmitted by the management controller device 304 to the management service sub-engine 306a (e.g., by verifying that the management controller device 304 is part of (and/or should remain in) the trust domain for the hyper-converged infrastructure system 202).

As such, in some embodiments, the management controller device 304 in the server computing device 206/302 may execute the executable command(s) and/or other instruction(s) included in the command block to retrieve identity information for the server computing device 206/302, while in some embodiments, the management service sub-engine 306a may execute the executable command(s) and/or other instruction(s) included in the command block to retrieve identity information for the server computing device 206/302 and provide that identity information to the management controller device 304. As discussed above, the identity information retrieved for a server computing device via the execution of the command block may include Media Access Control (MAC) addresses utilized by (or in) that server computing device, service tag(s) associated with that server computing device, Network Interface Controller (NIC) devices types included in the server computing device, and/or any other unique server computing device information that would be apparent to one of skill in the art in possession of the present disclosure. As will be appreciated by one of skill in the art in possession of the present disclosure, the execution of the command block by a computing device in the trust domain may be performed automatically and in a secure manner without credentials and/or certificates based on the discovery request that includes that command block being received from a system or device that is included in that trust domain.

Figure 6D:
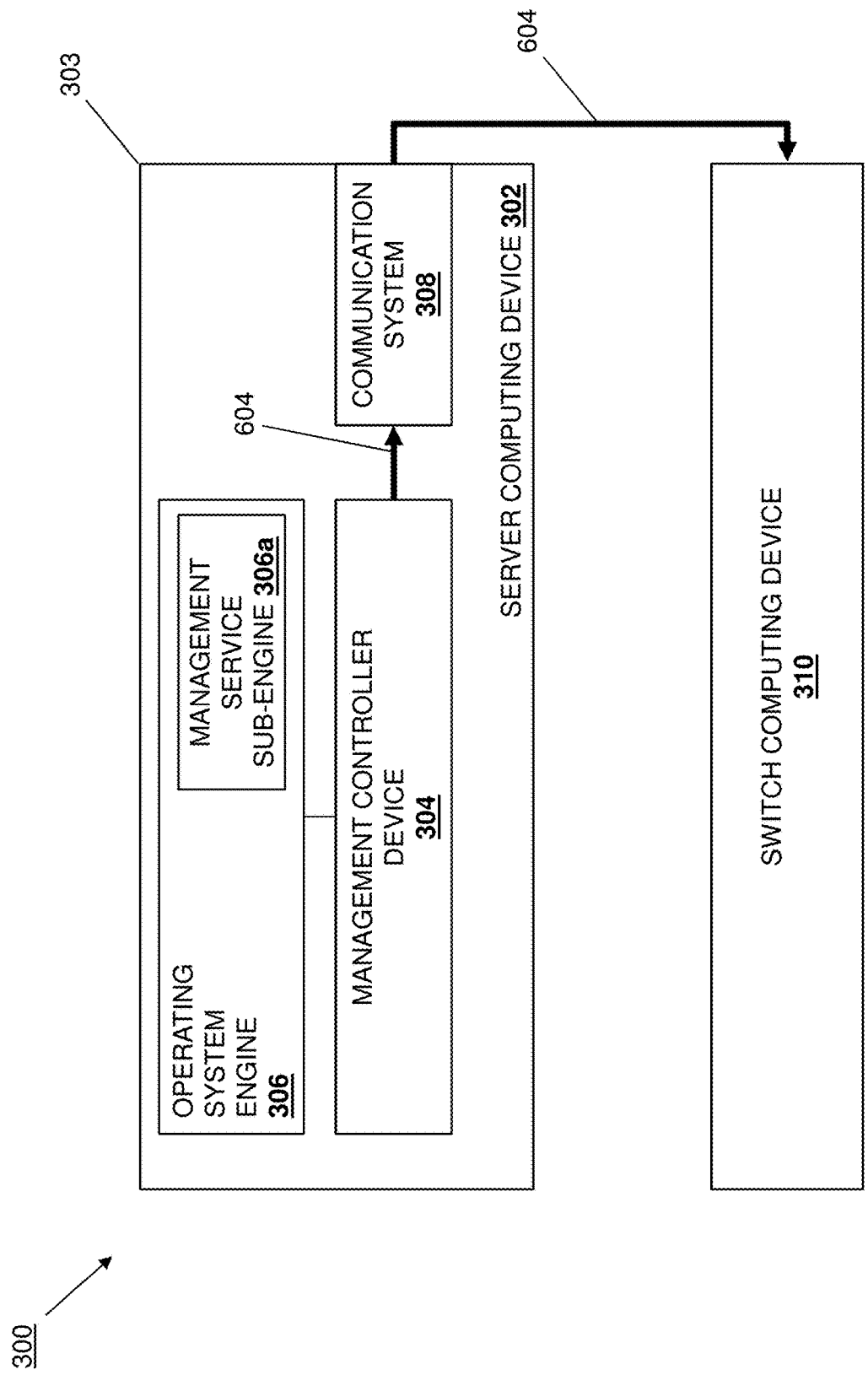
FIG. 6D is a schematic view illustrating an embodiment of devices in the computing device configuration of FIG. 3 operating during the method of FIG. 5.
Figure 6F:
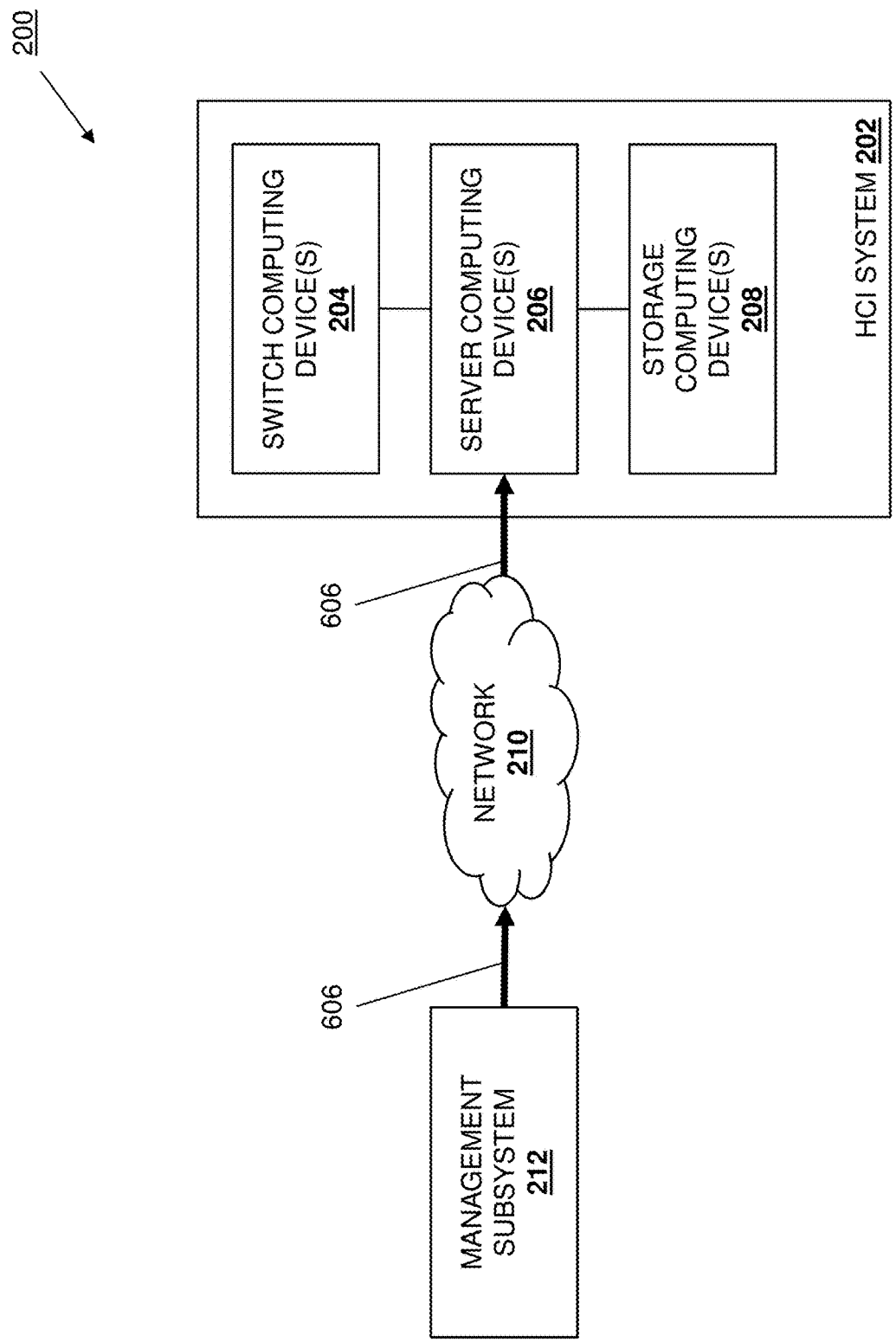
FIG. 6F is a schematic view illustrating an embodiment of the automated device discovery system of FIG. 2 operating during the method of FIG. 5.

With reference to FIGS. 6D and 6E, the execution of the command block may also include the management controller device performing identity information transmission operations 604 that, in the illustrated embodiment, include the transmission of the identity information retrieved at block 512 via its communication system 308 and to the switch computing device 310, which may then forward that identity information via the network 210 to the management subsystem 212 (i.e., in embodiments in which the management subsystem 212 broadcast the discovery request at block 502). With reference to FIG. 6F, in response to receiving the identity information from the server computing device 206/302 via its communication system 408, the automated device discovery engine 404 in the management subsystem 212/400 may perform identity information confirmation operations 606 that may include generating and transmitting a unicast identity information confirmation to the server computing device 206/302 in order to confirm the receipt of the identity information for the server computing device 206/302. However, while the illustrated embodiment describes transmitting the identity information the management subsystem 202, one of skill in the art in possession of the present disclosure will recognize that the identity information may be transmitted to (and confirmed by) any system or device that broadcast the discovery request at block 502 while remaining within the scope of the present disclosure as well.

Figure 6G:
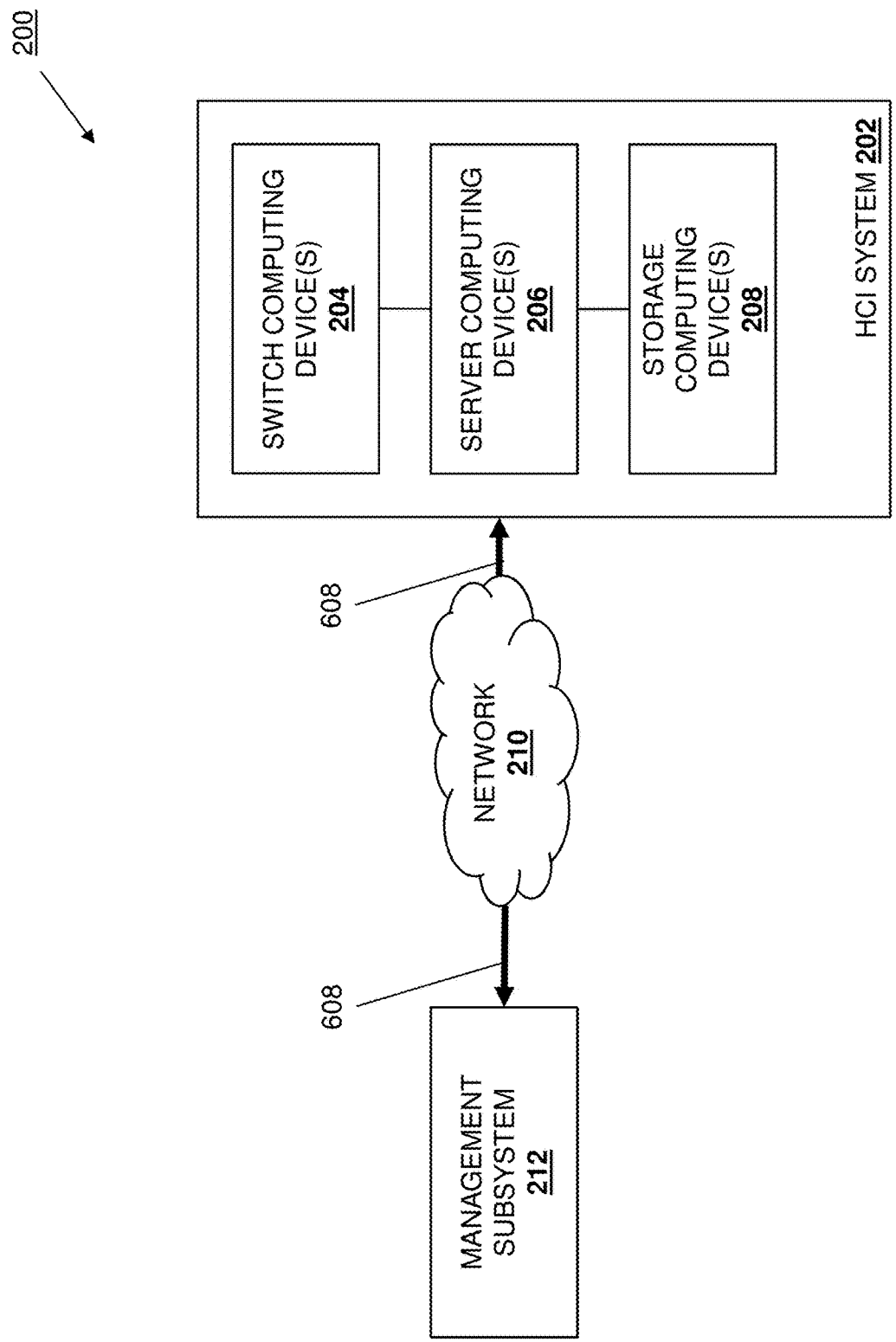
FIG. 6G is a schematic view illustrating an embodiment of the automated device discovery system of FIG. 2 operating during the method of FIG. 5

The method then proceeds to block 514 where the second computing device configures the first computing device to provide a hyperconverged infrastructure system using the identity information for the first computing device. As illustrated in FIG. 6G, in an embodiment of block 514, the automated device discovery engine 404 in the management subsystem 212 may then perform hyper-converged infrastructure system configuration operations 608 that may include configuring the server computing device 206 to provide the hyper-converged infrastructure system 202. For example, the inventors of the present disclosure describe some hyper-converged infrastructure system configuration operations in U.S. patent application Ser. No. 17/019,555, filed on Sep. 14, 2020, (directly to the automatic determination of an operating system networking configuration for an operating system provided by a server computing device); and U.S. patent application Ser. No. 17/019,630, filed on Sep. 14, 2020, (directly to the automatic configuration of networking for an operating system provided by a server computing device); the disclosure of which are incorporated herein by reference in their entirety. However, while the illustrated embodiment describes configuration of the server computing device by the management subsystem 202 to provide a hyper-converged infrastructure system, one of skill in the art in possession of the present disclosure will recognize that a variety of devices may be configured by a variety of other devices to provide a variety of different functionality while remaining within the scope of the present disclosure as well.

As discussed above, in addition to the "initial onboarding" process discussed above, an "expansion" process may be performed to discover a computing device that has been added to the hyper-converged infrastructure system 202 via a "target" discovery broadcast performed by that computing device. As will be appreciated by one of skill in the art in possession of the present disclosure, the "initial onboarding" process using the "source" discovery request broadcast as discussed above may be utilized in such a scenario, but will result in the generation, transmission, and receipt of duplicate identity information from a plurality of already-deployed computing devices in the hyper-converged infrastructure system 202. In order to avoid such unnecessary processing and communication transmissions, the automatic device discovery system of the present disclosure may be configured to have the computing device that is being added to the hyper-converged infrastructure system 202 broadcast a "target" discovery communication.

For example, with reference to the computing device configuration 300 discussed above with reference to FIG. 3, the server computing device 206/302 may be connected to the switch computing device 204/310 that is part of an already-configured hyper-converged infrastructure system 202 with other computing devices. In response, that server computing device 206/302 may perform the trust domain operations discussed above to join the trust domain for the hyper-converged infrastructure system 200, and then generate and broadcast a "target" discovery communication that includes the identity information for that server computing device 206/302. As will be appreciated by one of skill in the art in possession of the present disclosure, the "target" discovery communication broadcast by the server computing device 206/302 may be received by the management subsystem 212 and each of the other computing devices in the hyper-converged infrastructure system 202, and the "expansion" process for the automated device discovery system may provide for the ignoring of that "target" discovery communication by any of the computing devices in the hyper-converged infrastructure system 202 that is not performing the management subsystem functionality (although those computing devices may save the MAC address identified in the "target" discovery communications for trust domain purposes).

However, the computing device performing management subsystem functionality (e.g., the management subsystem 212) may receive that "target" discovery communication and, in response, generate and transmit an identity information confirmation to the server computing device 206/302 discussed above, and use that identity information to configure that server computing device 206/302 to provide the hyper-converged infrastructure system (e.g., by adding that server computing device 206/302 to the hyper-converged infrastructure system 202) substantially as discussed above. However, for computing devices that are not configured to broadcast the "target" discovery communications discussed below, the "initial onboarding" process using the "source" discovery request broadcast discussed above may be utilized to discover that computing device and configure it as part of the hyper-converged infrastructure system 202 in the manner discussed above.

Thus, systems and methods have been described that provide an agent-less and credential-less technique for discovering server computing devices that utilizes a trust domain built for computing devices provided in a hyper-converged infrastructure system, and that operates by having a management subsystem communicate with those computing devices within the trust domain by broadcasting a discovery request that identifies a server computing device type to-be discovered and commands to be executed by server computing devices to transmit their identity information to the management system so that the management system may configure those server computing devices as part of the hyper-converged infrastructure system. For example, the automated device discovery system of the present disclosure may include a first computing device and second computing devices that are included in a trust domain. The first computing device generates and broadcasts a discovery request for target computing device identification information, and each server computing device in the second computing devices receives the discovery request from the first computing device and, in response to being in the trust domain with the first computing device, determines that a target computing device type qualifier included in the discovery request identifies the server computing device type of that server computing device. In response, each of the server computing devices executes a command block that is included in the discovery request to generate and transmit identity information for that server computing device that is configured for use by the first computing device in configuring that server computing device to provide a hyper-converged infrastructure system. As such, server computing devices may be discovered in an efficient, agent-less, and credential-less manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated device discovery system, comprising:
   a first computing device that is included in a trust domain and that is configured to:
      generate a discovery request for target computing device identification information; and
      broadcast the discovery request; and
   a plurality of second computing devices that are included in the trust domain and that are coupled to the first computing device, wherein each of a first subset of the plurality of second computing devices are configured to:
      receive the discovery request from the first computing device and, in response to being in the trust domain with the first computing device:
         determine that a target computing device type qualifier that is included in the discovery request identifies a type of that second computing device;
         execute, in response to determining that the target computing device type qualifier identifies the type of that second computing device, a command block that is included in the discovery request; and
         generate and transmit, in response to executing the command block, identity information for that second computing device that is configured for use by the first computing device in configuring that second computing device to provide a hyper-converged infrastructure system.

2. The system of claim 1, wherein each of a second subset of the plurality of second computing devices are configured to:
   receive the discovery request from the first computing device and, in response to being in the trust domain with the first computing device:
      determine that a target computing device type qualifier that is included in the discovery request does not identify a type of that second computing device and, in response, discard the discovery request.

3. The system of claim 1, wherein each of the first subset of the plurality of second computing devices are configured to execute the command block that is included in the discovery request without credentials in response to being in the trust domain with the first computing device.

4. The system of claim 1, wherein the target computing device type qualifier identifies the type of each of the first subset of the plurality of second computing devices by identifying an Application Programming Interface (API) included on each of the first subset of the plurality of second computing devices.

5. The system of claim 1, wherein each of the first subset of the plurality of second computing devices are configured to:
   retrieve the identity information for that second computing device from a management controller device that is included in that second computing device.

6. The system of claim 1, wherein each of the first subset of the plurality of second computing devices are configured to:
   retrieve the identity information for that second computing device from an operating system provided by that second computing device.

7. The system of claim 1, further comprising:
   a third computing device that is coupled to the first computing device and that is configured to:
      join the trust domain;
      generate and broadcast, in response to joining the trust domain, identity information for the third computing device that is configured for use by the first computing device in configuring the third computing device to provide the hyper-converged infrastructure system.

8. An Information Handling System (IHS), comprising:
a processing system; and
a memory system that is coupled to the processing system and that includes instructions that, when executed by the processing system, cause the processing system to provide an automated device discovery engine that is configured to:
  receive a discovery request that was broadcast by a first computing device; and
  determine that the automated device discovery engine is in a trust domain with the first computing device and, in response:
    determine that a target computing device type qualifier that is included in the discovery request identifies a type of the IHS;
    execute, in response to determining that the target computing device type qualifier identifies the type of the IHS, a command block that is included in the discovery request; and
    generate and transmit, in response to executing the command block, identity information for the IHS that is configured for use by the first computing device in configuring the IHS to provide a hyper-converged infrastructure system.

9. The IHS of claim 8, wherein the automated device discovery engine is configured to:
  execute the command block that is included in the discovery request without credentials in response to being in the trust domain with the first computing device.

10. The IHS of claim 8, wherein the target computing device type qualifier identifies the type of the IHS by identifying an Application Programming Interface (API) included on the IHS.

11. The IHS of claim 8, wherein the automated device discovery engine is configured to:
  retrieve the identity information for the IHS from a management controller device that is included in the IHS.

12. The IHS of claim 8, wherein the automated device discovery engine is configured to:
  retrieve the identity information for the IHS from an operating system that is included in the trust domain and that is provided by the IHS.

13. The IHS of claim 12, wherein the automated device discovery engine is configured to:
  verify, to the operating system, that the automated device discovery engine is included in the trust domain.

14. A method for automatically discovering devices, comprising:
  receiving, by a first computing device, a discovery request that was broadcast by a second computing device; and
  determining, by the first computing device, that the second computing device is in a trust domain with the first computing device and, in response:
    determining, by the first computing device, that a target computing device type qualifier that is included in the discovery request identifies a type of the first computing device;
    executing, by the first computing device in response to determining that the target computing device type qualifier identifies the type of the first computing device, a command block that is included in the discovery request; and
    generating and transmitting, by the first computing device in response to executing the command block, identity information for the first computing device that is configured for use by the second computing device in configuring the first computing device to provide a hyper-converged infrastructure system.

15. The method of claim 14, wherein
receiving, by a third computing device, the discovery request from the first computing device and, in response to being in the trust domain with the second computing device:
  determining that a target computing device type qualifier that is included in the discovery request does not identify a type of that third computing device and, in response, discarding the discovery request.

16. The method of claim 14, further comprising:
executing, by the first computing device, the command block that is included in the discovery request without credentials in response to being in the trust domain with the second computing device.

17. The method of claim 14, wherein the target computing device type qualifier identifies the type of the first computing device by identifying an Application Programming Interface (API) included on the first computing device.

18. The method of claim 14, further comprising:
retrieving, by the first computing device, the identity information for the first computing device from a management controller device that is included in the first computing device.

19. The method of claim 14, further comprising:
retrieving, by the first computing device, the identity information for the first computing device from an operating system provided by the first computing device.

20. The method of claim 14, wherein
joining, by a third computing device, the trust domain; and
generating and broadcasting, by the third computing device in response to joining the trust domain, identity information for the third computing device that is configured for use by the second computing device in configuring the third computing device to provide the hyper-converged infrastructure system.

* * * * *

UNITED STATES PATENT AND TRADEMARK OFFICE
CERTIFICATE OF CORRECTION

Page 1 of 1

PATENT NO.       : 11,095,730 B1
APPLICATION NO.  : 17/019714
DATED            : August 17, 2021
INVENTOR(S)      : Ravikanth Chaganti et al.

It is certified that error appears in the above-identified patent and that said Letters Patent is hereby corrected as shown below:

On the Title Page

Item (73), Assignee: "Dell Products LLP" should read --Dell Products L.P.--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*